United States Patent [19]

Malla et al.

[11] Patent Number: 5,425,934
[45] Date of Patent: Jun. 20, 1995

[54] DEALUMINATION AND SELECTIVE REMOVAL OF ORGANIC MATERIAL FROM ZEOLITES

[75] Inventors: Prakash B. Malla, Sandersville, Ga.; Sridhar Komarneni, State College, Pa.

[73] Assignee: Gas Research Institute, Chicago, Ill.

[21] Appl. No.: 172,769

[22] Filed: Dec. 27, 1993

[51] Int. Cl.$^6$ .................. C01B 33/34; B01J 29/08
[52] U.S. Cl. ................ 423/714; 423/DIG. 21; 423/715; 502/85
[58] Field of Search ............. 423/713, 714, DIG. 21, 423/715; 502/85, 77, 79

[56] References Cited

U.S. PATENT DOCUMENTS

| | | | |
|---|---|---|---|
| 1,831,673 | 11/1931 | Liebknecht | 423/714 X |
| 3,475,345 | 10/1969 | Benesi | 423/714 X |
| 3,492,088 | 1/1970 | Hildebrandt | 423/701 |
| 3,506,400 | 4/1970 | Eberly et al. | 423/DIG. 21 X |
| 3,691,099 | 9/1972 | Young | 423/714 X |
| 3,766,093 | 10/1973 | Chu | 502/72 X |
| 3,836,561 | 9/1974 | Young | 502/85 X |
| 4,273,753 | 6/1981 | Chang | 502/71 |
| 4,533,533 | 8/1985 | Dewing et al. | 423/715 |
| 5,066,630 | 11/1991 | Kitamura et al. | 502/85 |
| 5,143,878 | 9/1992 | Dai et al. | 502/66 |
| 5,143,879 | 9/1992 | Whitehurst | 502/85 |
| 5,200,168 | 4/1993 | Apelian et al. | 423/714 |
| 5,242,677 | 9/1993 | Cooper et al. | 423/714 |

FOREIGN PATENT DOCUMENTS 1061847  3/1967  United Kingdom ............... 423/714

OTHER PUBLICATIONS

Meier & Olson *Atlas of Zeolite Structure Types* 1992 (No Month) pp. 96–97.
Delprato et al, "Synthesis of New Silica-Rich Cubic and Hexagonal 1Faujasites Using Crown-Ether-Based Supramolecules as Templates", *Zeolites*, 1990, vol. 10, Jul./Aug., pp. 546–552.
Gelsthorps et al, "The Efficient Removal of Organic Templating Molecules from Aluminophosphate Molecular Sieves", J. Chem. Soc., Chem. Commun., 1986, pp. 781–782. (No Month).

*Primary Examiner*—Mark L. Bell
*Assistant Examiner*—David Sample
*Attorney, Agent, or Firm*—Andrew Alexander

[57] ABSTRACT

Disclosed is a method for treating synthetic zeolite to remove organic template material therefrom and concurrently therewith effect dealumination of the zeolite. The method comprises the steps of providing a body of synthetic zeolite containing organic template material, the zeolite having an $SiO_2/Al_2O_3$ ratio of at least 7:1. The body is treated with a solution comprised of an alcohol selected from methanol, ethanol and propanol and an acid selected from hydrochloric, nitric and sulfuric acid at a temperature and time to remove the organic template material therefrom and to effect dealumination thereof to provide a treated zeolite product. The treated product is washed to remove residual solution and then dried to provide a synthetic zeolite product containing a reduced amount of organic template material and having an $SiO_2/Al_2O_3$ ratio of at least 7:1.

11 Claims, 4 Drawing Sheets

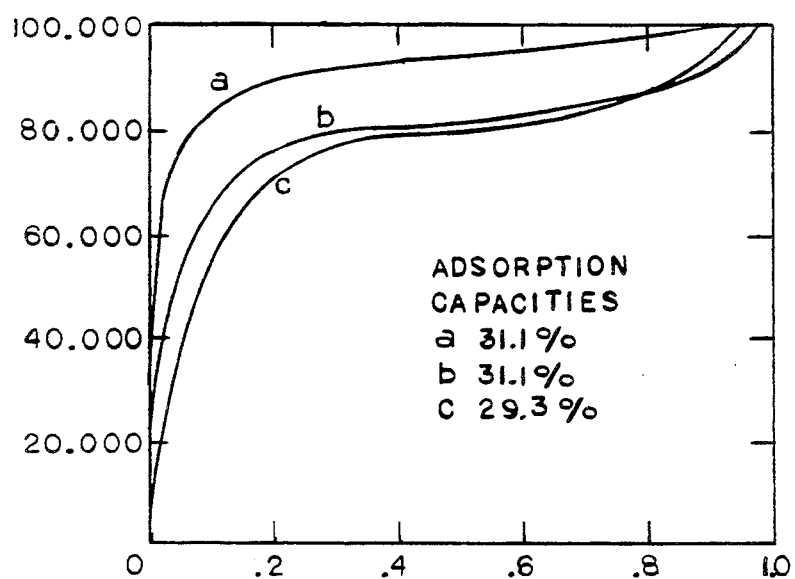
FIG 4a
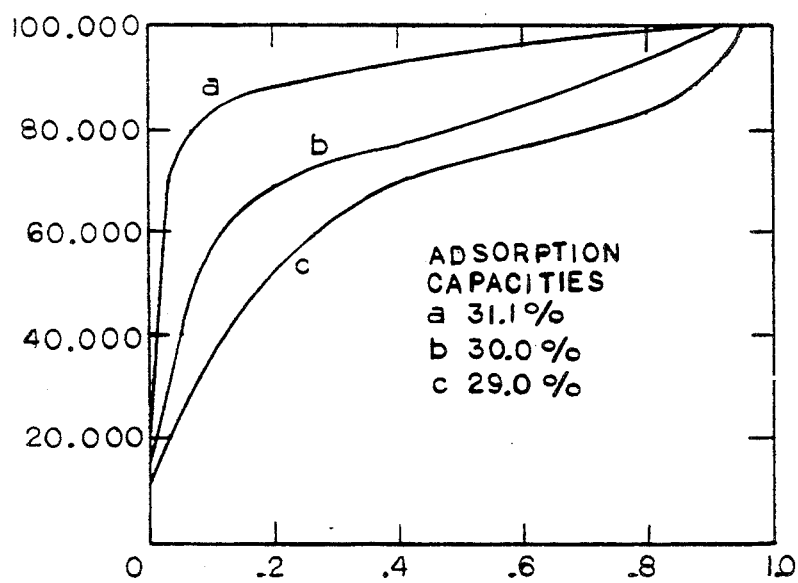
FIG 4b
FIG 5
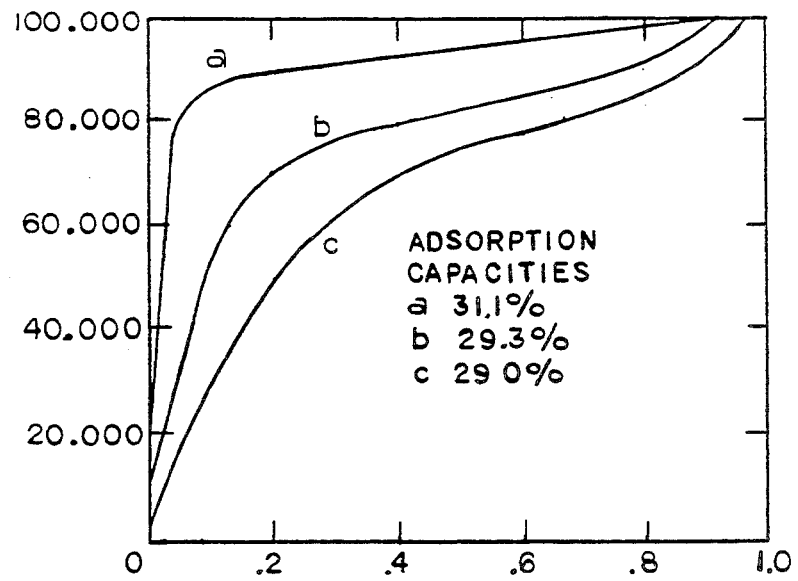

DEALUMINATION AND SELECTIVE REMOVAL OF ORGANIC MATERIAL FROM ZEOLITES

This invention relates to zeolites and more particularly it relates to a method for dealumination and selective removal of organic templates from synthetic zeolites.

For zeolites or aluminosilicates, properties such as catalytic activity and thermal stability are known to improve as the Si/Al ratio is increased. Thus, there is always considerable effort applied to increasing this ratio. One way of increasing the ratio is by the removal of aluminum from the aluminosilicate structure. Aluminum atoms can be removed from the crystalline structure by treating with hydrochloric acid, for example. To further improve the ratio of Si/Al, other approaches have been used. For example, Delprato et al in an article entitled "Synthesis of New Silica-Rich Cubic and Hexagonal Faujasites Using Crown-Ether-Based Supramolecules as Templates", Zeolites, 1990, Vol. 10, disclose the use of organic templates of the crown-ether family to provide well crystallized faujasite-type zeolites having a framework $SiO_2/Al_2O_3$ ratio approaching 10. In this process, 15-crown-5 ether provides cubic phase faujasite and 18-crown-6 ether provides hexagonal phase faujasite. However, zeolites prepared in this manner, while having a high $SiO_2/Al_2O_3$ ratio, have a high Na content and have organic template material occluded in the micropores. This renders such zeolites less active or desirable as a catalyst, for example. Thus, it is desirable to provide a method which would remove the organic template material and improve the $SiO_2/Al_2O_3$ ratio.

While hydrochloric acid has been used to increase the $SiO_2/Al_2O_3$ ratio, it does not remove the organic material occluded in the pores of the synthetic zeolites.

U.S. Pat. No. 3,492,088 discloses a method of preparing an acid-acting crystalline aluminosilicate catalyst. The method is concerned with preparing an acid-acting crystalline aluminosilicate catalyst characterized by thermally stable acid sites which comprises ion-exchanging a crystalline alkali metal aluminosilicate with an alcoholic ion-exchange solution comprising a soluble compound selected from the group consisting of an acid and an acid salt. In the method of the invention, the crystalline alkali metal aluminosilicate is ion-exchanged with an acid and/or acidic salt in an alcoholic solution.

In an article entitled "The Efficient Removal of Organic Templating Molecules from Aluminophosphate Molecular Sieves", Jan. 1986, Gelsthorps et al, it is noted that while calcination appears effective for the removal of organic templates from zeolites, it is less satisfactory for aluminophosphate molecular sieves and that methanolic hydrochloric acid resulted in the complete removal of the organic templating material.

Dealumination processes such as disclosed in U.S. Pat. Nos. 4,273,753 and 4,533,533 are not effective in removing the organic template material. In the past, removal of the organic template material has been attempted by heating. However, heating has been unsatisfactory because the synthetic zeolite material tends to disintegrate after removal of the organic template. Therefore, there is a great need for a process which selectively removes the organic templates and concurrently therewith can improve the $SiO_2/Al_2O_3$ ratio without adversely affecting the zeolites.

SUMMARY OF THE INVENTION

It is an object of the invention to provide an improved zeolite product.

It is another object of the invention to provide novel synthetic zeolites free of organic template material in large pores thereof, e.g. with free apertures (cage entrances) of 4 Angstroms or greater while maintaining organic template material in smaller pores in the zeolites.

It is a further object of the invention to provide an improved zeolite product having reduced amounts of aluminum, sodium or calcium.

Yet, it is another object of the invention to provide a novel method for selectively removing organic material or templates from synthetic zeolites.

And yet, it is a further object of the invention to provide an improved one step method for selectively removing organic templates from synthetic zeolites and concurrently therewith removing aluminum atoms therefrom.

Still yet, it is another object of the invention to provide a novel method which selectively removes organic templates from large pores in synthetic zeolites and permits organic template material to remain in smaller pores in the zeolites to maintain the integrity of the zeolites.

These and other objects will become apparent from the specification, drawings and claims appended hereto.

In accordance with these objects there is provided a method for treating synthetic zeolite to selectively remove organic template material therefrom and concurrently therewith effect dealumination to improve the $SiO_2/Al_2O_3$ ratio. The method comprises the steps of providing a body of synthetic zeolite containing organic template material and treating the body of synthetic zeolite with a solution comprised of an alcohol selected from methanol, ethanol and propanol and an acid selected from hydrochloric, nitric and sulfuric acid. The treating is carried out at a temperature and time to selectively remove organic template material therefrom and to effect dealumination thereof to provide a treated zeolite product. Thereafter, the treated zeolite product is washed to remove residual solution and then dried to provide a synthetic zeolite product containing a reduced amount of organic template material and having an increased $SiO_2/Al_2O_3$ ratio. The improved product is suitable for use as a desiccant, adsorbent or catalyst for crude oil cracking and refining, for example.

BRIEF DESCRIPTION OF THE DRAWINGS

FIGS. 4a and 4b show water adsorption isotherms (degassed at 300° C.) of cubic faujasite synthesized in the presence of 15-crown-5 ether; (FIG. 4a): (a) original sample calcined in air (500° C.); (b) 1M methanolic HCl treated; and (c) same as b but steamed at 600° C.; (FIG. 4b): (a) original calcined in air (500° C.); (b) 1.5M methanolic HCl treated sample; and (c) same as b but steamed at 600° C.

FIG. 5 shows a comparison of water adsorption isotherms of cubic faujasite synthesized in the presence of 15-crown-5 ether: (a) original sample calcined in air (500° C.); (b) 1M methanolic HCl treated and steamed at 600° C.; and (c) 1.5M methanolic HCl treated and steamed sample at 600° C.

DETAILED DESCRIPTION OF THE PREFERRED EMBODIMENTS

Figure 1A:
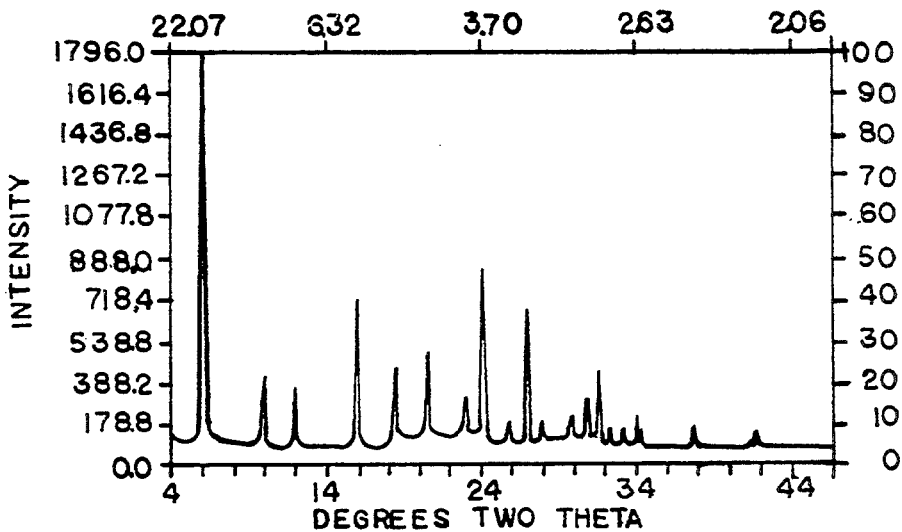
FIGS. 1a and 1b show X-ray diffraction patterns of methanolic HCl treated zeolite Y: (a) 25 ml; and (b) 50 ml.

Natural zeolite is a hydrated silicate of aluminum and either sodium or calcium or both and has the formula $Na_2O \cdot Al_2O_3 \cdot n\ SiO_2 \cdot x\ H_2O$. Artificial zeolites are synthesized for such uses as water softening, gas adsorbents, drying agents or desiccants and catalyst for crude oil cracking and refining, for example. Synthetic zeolites such as zeolite y or cubic faujasite having the formula $Na_2O \cdot Al_2O_3 \cdot n\ SiO_2 \cdot x\ H_2O$ where n can range from 2 to 10 and x can range from 2 to 8.9. Typical cubic faujasite can have the formula $Na_2O \cdot Al_2O_3 \cdot 5.3\ SiO_2 \cdot x\ H_2O$ or $Na_2O \cdot Al_2O_3 \cdot 7\ SiO_2 \cdot x\ H_2O$. Typical hexagonal type faujasite is represented by the formula $Na_2O \cdot Al_2O_3 \cdot 8\ SiO_2 \cdot x\ H_2O$.

By organic template material as used herein is meant organic material remaining in the zeolite compound after the synthetic formation of zeolites such as faujasite-type zeolite using organic templates such as disclosed by Delprato et al.

Zeolites can be described as crystalline aluminosilicates consisting of a rigid three-dimensional framework of $SiO_4$ and $AlO_4$ in which tile tetrahedra are cross linked by sharing of oxygen atoms to provide a ratio of the total aluminum and silicon atoms to oxygen of 1:2. The negative charge created by aluminum substitution is balanced by a cation included in the crystal, such cation being an alkali or alkaline earth metal cation. The cations may be exchanged entirely or partially for another cation using ion-exchange techniques. By varying the cations, it is possible to vary the properties of the zeolite.

In accordance with the invention, synthetic zeolites, such as cubic or hexagonal faujasite ($SiO_2/Al_2O_3=7,8$) and SAPO 37 were synthesized using organic templates fitting the faujasite supercage and the small $\beta$-cage. SAPO 37 (silicoaluminophosphate cubic faujasite) was synthesized using the procedure described in Saldarriaga et al (*Journal of American Chemical Society*, 1987, 109, 2686). The cubic or hexagonal faujasite was synthesized using the procedures disclosed in the Delprato et al and Saldarriaga et al references, incorporated herein by reference.

It has now been discovered that the organic template material can be selectively removed by a new process to open pores of the faujasite while retaining organic template material in other pores, thereby providing for a more effective material suitable as a desiccant, adsorbent or catalyst. The pore diameter of the zeolites can range from 3 to 100 Angstroms and typically 3 to 15 Amgstroms. The new process has the additional advantage that it permits the dealumination of zeolite to provide material having an $SiO_2/Al_2O_3$ ratio of at least 7:1 and typically greater than 10:1.

In the present invention, the organic template material is removed in accordance with the invention by treatment with an acid/alcohol solution. Preferably, the acid is an inorganic acid. Further, acids suitable for use in the solution can be selected from the group comprising nitric, sulfuric, hydrochloric, chromic, phosphoric, acetic, citric and oxalic or a combination of such acids, depending on the constituents desired to be removed from the zeolite lattice. The preferred acids are selected from nitric, sulfuric and hydrochloric acid with hydrochloric acid being highly suitable.

The alcohol which is used in the solution can be any alcohol which is effective in combination with the acids in selectively removing the organic template material. Preferred alcohols that may be used include methanol, ethanol, propanol, or butanol, or combinations thereof, with the preferred alcohol being methanol.

The concentration of the solution can vary widely depending to some extent on the combination of alcohols and acids used. Further, the concentrations can vary depending on the zeolite being treated and the extent to which it is desired to remove organic template material, alkali metals and the extent to which dealumination is to be performed. It is preferred to carry out the treatment at conditions that remove organic template material to a level of greater than 70 wt. % organic template material in free apertures greater than about 4 Angstroms diameter. In addition, it is preferred to remove the alkali metals to a level of less than 1 wt. % alkali metal. Suitable solutions can contain 0.1 to 2M acid in alcohol. For example, a useful solution can contain 0.5 to 1.5M HCl acid in methanol. In addition, it may be useful to subject the zeolite material to several treatments to obtain the level of removal desired.

The temperature at which the treatment is carried out can range from about room temperature to near the boiling point of the solution. At higher temperatures, organic template material removal is accelerated along with the removal of metals. Preferably, the temperature for treatment is maintained in a temperature range of about 100° to 200° C. with a typical range being 140° to 150° C.

The time of treatment depends on the level to which it is desired to reduce the organic template material, as well as the alkali metals and the aluminum. In addition, the time of treatment will vary depending on the temperature of the solution and the particular zeolite compound selected to be treated. Thus, the treatment can extend from about 2 hours to about 30 hours, with a preferred period being in the range of 6 to 18 hours.

Efficiency of removal of organic template material can be aided by pressure. Thus, treatment can be carried out at atmospheric pressure or higher pressures but preferably, it is carried out in a closed vessel under autogenous pressure conditions.

The treatment in accordance with the invention provides selective removal of organic template material. That is, the treatment in accordance with the invention has the ability to selectively remove organic template material from pores in the zeolite compound having a free aperture of greater than about 4 Angstroms. Further, pores having a free aperture of less than 4 Angstroms retain the organic template material.

After treatment with the alcoholic-acid solution, the treated zeolite compound is washed preferably at room temperature. Calcining at this stage should be avoided for some molecular sieves such as SAPO 37 because it can destroy the remaining organic template material and thus the integrity of the synthetic zeolite. Preferably, the wash solution is an alcohol, and further preferably, the alcohol is the alcohol used in the solution to remove the organic material. For example, if a methanolic acid is used for purposes of removing the organic material, preferably, the wash treatment uses methanol. After the alcohol wash, the zeolite product should then be washed with deionized water to remove both alcoholic/acid solution and released aluminum and sodium ions. Thereafter, the product can be dried at about 60° C.

For purposes of promoting further dealumination after the alcoholic/acid treatment, the zeolite product may be subjected to a steam treatment to provide for further stabilization of the zeolite material. The steam treatments can be performed in a temperature range of 300° to 800° C.

The invention has the advantage that organic template material is selectively removed from pores having a free aperture of about 4 Angstroms and greater of synthetic zeolites. Organic template is retained in pores having a free aperture of about 4 Angstroms or less. Retaining the organic template material in the smaller pores ensures that the synthetic zeolite having free aperture of pores in the range of 3 to 100 Angstroms does not collapse or disintegrate and yet larger pores are provided to increase effectiveness. Further, dealumination can occur for an increased $SiO_2/Al_2O_3$ ratio to provide a more useful zeolite product.

EXAMPLE 1

Figure 1B:
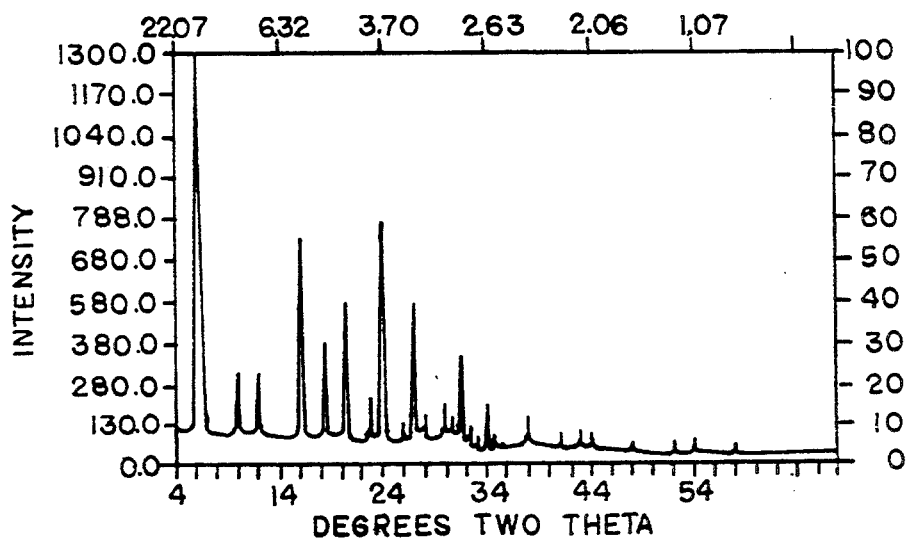
Figure 2:
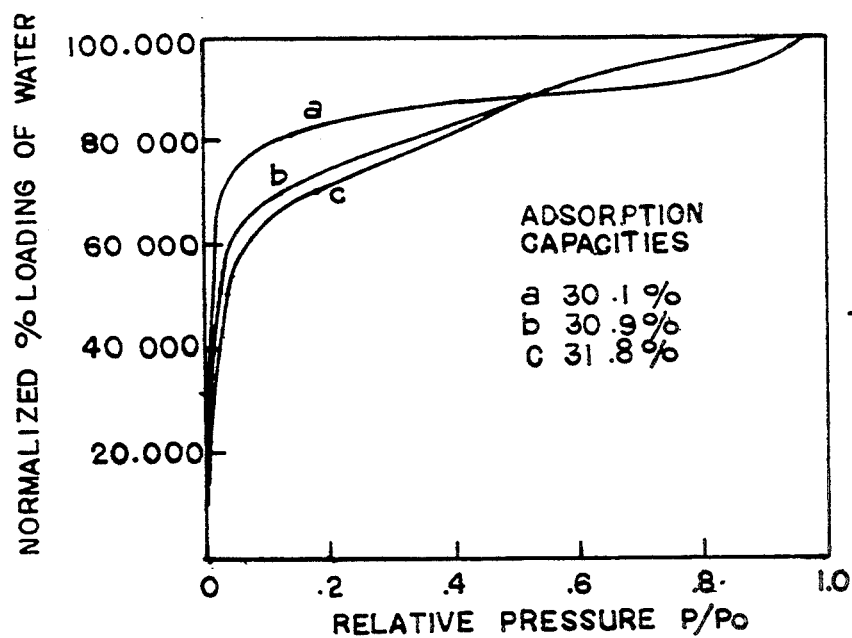
FIG. 2 shows water adsorption isotherms (degassed at 200° C.) of zeolite Y: (a) original Na—Y; (b) Na—Y treated with 25 ml methanolic HCl (not steamed); and (c) Na—Y treated with 50 ml methanolic HCl (not steamed).

One gram of zeolite Y (cubic faujasite) ($SiO_2/Al_2O_3=5.3$) was suspended in each of 25 and 50 ml of methanol containing 0.5M HCl (0.5M methanolic HCl) and heated in a Teflon lined stainless steel vessel (123 ml, Parr bomb) at 150° C. and autogenous pressure for 16 hours. After 16 hours, the vessel was removed from the oven, cooled to room temperature and washed first with methanol and then with deionized water. The washed samples were dried at 60° C. Both the samples treated with 25 and 50 ml methanolic HCl retained their crystallinity (FIG. 1). Water adsorption isotherms of these samples after degassing at 200° C. were measured at 25° C. and were compared with water adsorption isotherms of the original Na—Y (FIG. 2). An extreme Type I isotherm shape of Brunauer classification of Na—Y was shifted to moderate Type I, indicating a decrease in hydrophilicity of the treated sample as a result of removal of aluminum from the structure.

EXAMPLE 2

Figure 3C:
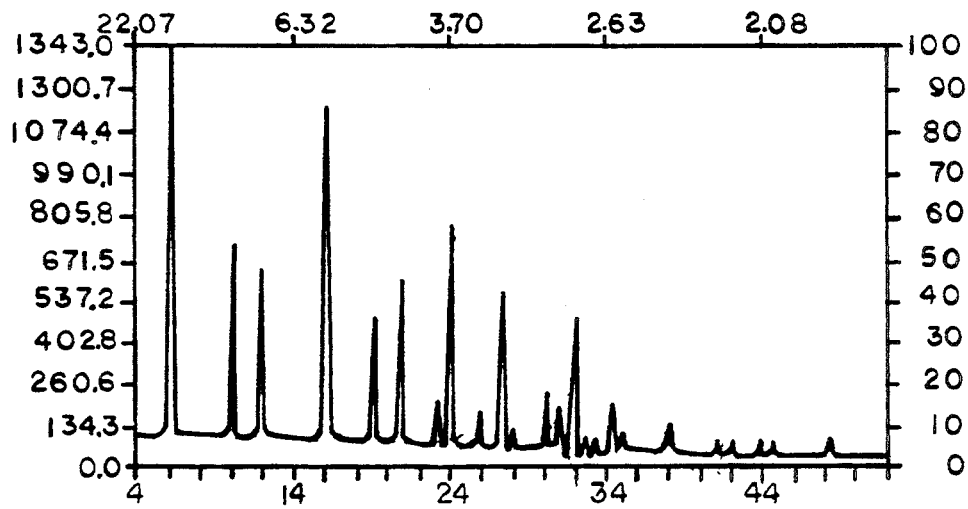
FIGS. 3a, 3b and 3c show X-ray diffraction patterns of cubic faujasite synthesized in the presence of 15-crown-ether: (a) original uncalcined sample; (b) 1M methanolic HCl treated and steamed sample at 600° C.; and (c) 1.5M methanolic HCl treated and steamed sample at 600° C.
Figure 3B:
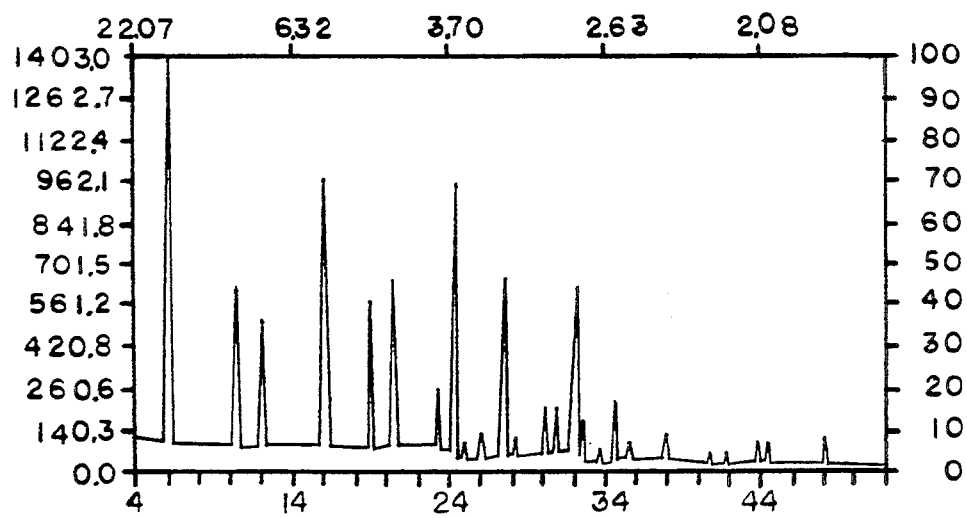
Figure 3A:
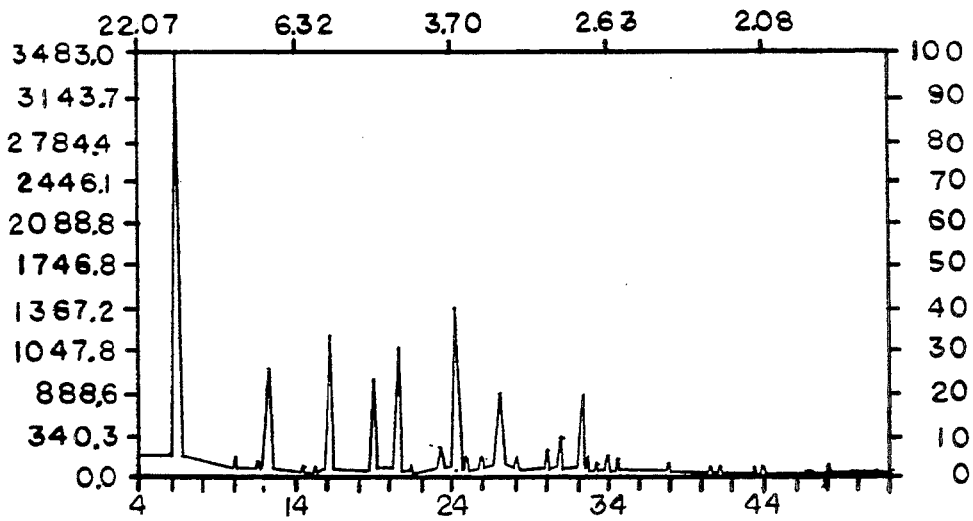

A cubic faujasite ($SiO_2/Al_2O_3=7$) was synthesized in the presence of 15-crown-5 ether following the procedure of Delprato et al. The crown ether molecules were occluded in the cages of the zeolite during synthesis. One gram of the cubic faujasite was treated with 75 ml of each of 1 and 1.5M methanolic HCl (methanol containing 1 and 1.5M HCl ) as in Example 1. Then, the methanolic HCl treated samples were heated for 4 hours at 600° C. in the presence of steam. The crystallinity of both the samples were preserved (FIG. 3). A sample of the cubic faujasite was calcined in air at 600° C. Water adsorption isotherms of these samples are shown in FIGS. 4 and 5. The isotherm shapes of samples treated with methanolic HCl and degassed at 300° C. shifted to moderate Type I (to the right) compared to the sample which was calcined in air to remove organic molecules. The methanolic HCl treated samples which were heated in the presence of steam exhibited isotherm shapes which were more moderate compared to those not steamed or those calcined only. This indicated that some dealumination and decationation occurred after treatment with methanolic HCl and the dealumination increased by steaming. It should be noted that the adsorption capacities of the calcined sample and the methanolic HCl treated samples with or without steaming are comparable indicating that the methanolic HCl was effective in the removal of organic template molecules. The methanolic HCl treated samples when heated at 300° C. in vacuum or steam at 600° C. became gray to black in color indicating that some organic molecules remained in the zeolite which were converted to carbon after heating. The carbonaceous residue can be removed by heating at 400°–800° C. in air.

EXAMPLE 3

Figure 6:
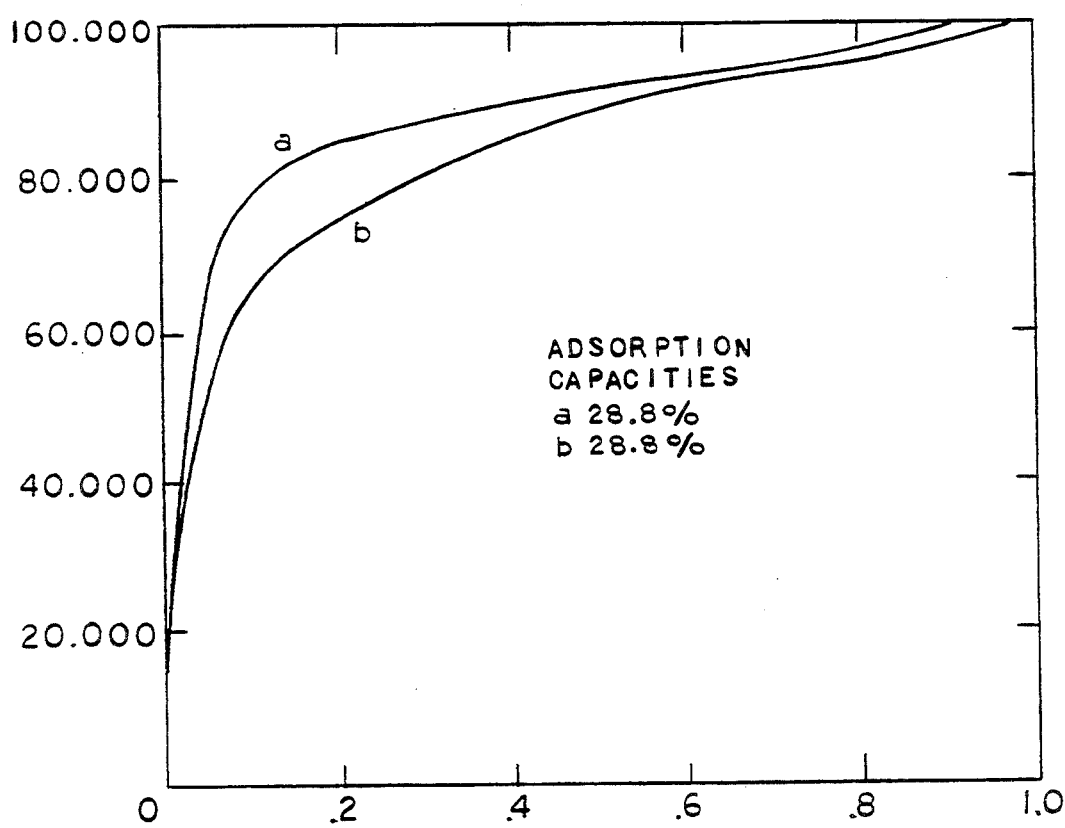
FIG. 6 shows water adsorption isotherms (degassed at 200° C.) of hexagonal faujasite (EMT) synthesized in the presence of 18-crown-6 ether: (a) original sample calcined in air (500° C.); and (b) 1M methanolic HCl treated sample.

One gram of a hexagonal polytype of faujasite (EMT) which was synthesized in the presence of 18-crown-6 ether ($SiO_2/Al_2O_3=8$; Delprato et al, *Zeolites*, 1990, 10, 546–552) was treated with 75 ml of 1M methanolic HCl in a manner similar to that described in Example 1. The water adsorption isotherms of the sample degassed at 200° C. are presented in FIG. 6. The methanolic HCl treated sample exhibited a moderate Type I isotherm compared to that of the calcined sample which exhibited extreme Type I. As in Example 2, the methanolic HCl treatment removes occluded organic molecules in the zeolite, but also is effective in dealuminating. This treatment is as effective as the calcination process in removing organic template material.

EXAMPLE 4

Figure 7:
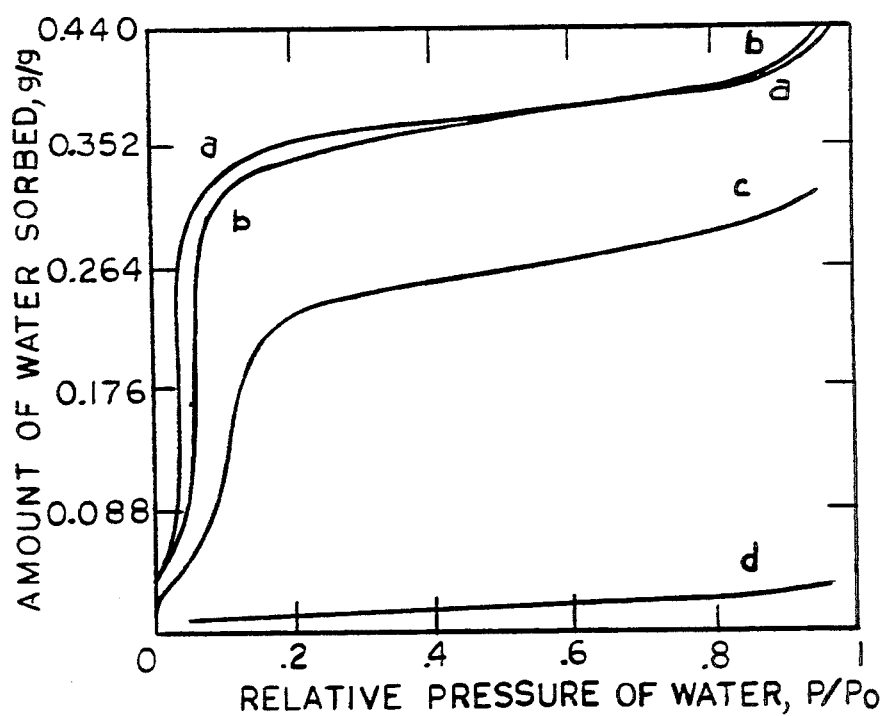
FIG. 7 shows a water adsorption of SAPO 37: (a) calcined at 600° C.; (b) methanolic HCl treatment followed by calcination at 600° C.; (c) methanolic HCl treated only; and (d) as synthesized sample.

SAPO 37 (silicoaluminophosphate cubic faujasite) was synthesized using the procedure described in Saldarriaga et al (*Journal of American Chemical Society*, 1987, 109, 2686). The framework of SAPO-37 has three-dimensional channels with free apertures of 7.4 Angstroms formed by 12 rings. The aperture leads to a supercage of about 13 Angstroms in diameter. In addition to the supercages, SAPO 37 has β-cages of diameter of 6.6 Angstroms with free openings of 2.6 Angstroms. The SAPO 37 was crystallized in the presence of tetramethylammonium and tetrapropylammonium ions. The organic molecules by virtue of their sizes occupy specific cages in SAPO 37: tetramethylammonium ion in β-cages and tertrapropylammonium ion in supercages. Because all the cages in SAPO 37 are filled with organic molecules, the as-synthesized SAPO 37 adsorbs very little water (FIG. 7d). After calcination at >500° C., the organic molecules will be removed and all the cages (micropores) will be freed up for water adsorption (FIG. 7a). The calcined sample, however, is unstable in the presence of moisture and loses all of its adsorption ability. When 1 g of SAPO 37 is treated with a 50 ml of 1M methanolic HCl, the organic molecules in the supercages are selectively removed. Although the water adsorbed by this sample is slightly lower (FIG. 7c) compared to that of the calcined sample, the integrity of the sample is preserved; that is, the sample is stable against water. When the methanolic HCl-treated sample is calcined, the adsorption capacity is increased to the level of the original calcined sample (FIG. 7b). This sample was again rendered amorphous in the presence of water. This indicates that selective removal of organic molecules from the supercages while keeping those in β-cages is important in maintaining the crystalline structure of the zeolite.

While the invention has been set forth with respect to preferred embodiments, all embodiments are claimed which come within the spirit of the invention.

What is claimed is:

1. A method for treating synthetic zeolite to remove organic template material therefrom and concurrently therewith effect dealumination of said zeolite, the method comprising the steps of:
   (a) providing a body of synthetic zeolite containing organic template material, said zeolite having an $SiO_2/Al_2O_3$ ratio of at least 7:1;
   (b) treating said body of synthetic zeolite with a solution comprised of an alcohol selected from the group consisting of methanol, ethanol and propanol and an acid selected from the group consisting of hydrochloric, nitric and sulfuric acid at a temperature and time to remove said organic template material therefrom and to effect dealumination thereof to provide a treated zeolite product;
   (c) washing said treated zeolite product to remove residual solution; and
   (d) drying said product to provide a synthetic zeolite product containing a reduced amount of organic template material and having an $SiO_2/Al_2O_3$ ratio of at least 10, said zeolite product containing organic template material in free apertures less than about 4 Angstroms and being free of organic template material in free apertures greater than about 4 Angstroms.

2. The method in accordance with claim 1 wherein the alcohol is methanol and the acid is hydrochloric acid.

3. The method in accordance with claim 1 wherein the treating is carried out at a temperature in the range of 100° to 200° C.

4. The method in accordance with claim 1 wherein the treating is carried out at a pressure in the range of 1 to 16 atmospheres.

5. The method in accordance with claim 1 wherein the treating is carried out for a time in the range of 2 to 36 hours.

6. The method in accordance with claim 1 wherein said synthetic zeolite has a free aperture size ranging from about 3 to 100 Angstroms.

7. The method in accordance with claim 1 wherein said synthetic zeolite is faujasite.

8. A method for treating faujasite to selectively remove organic template material therefrom and concurrently therewith effect dealumination of said faujasite, the method comprising the steps of:
   (a) providing a body of faujasite containing organic template material;
   (b) treating said body of faujasite with a solution comprised of methanol and hydrochloric acid at a temperature and time to remove said organic template material from pores therein having a free aperture diameter greater than about 4 Angstroms and concurrently therewith effect dealumination thereof to provide a treated faujasite product;
   (c) washing said treated faujasite product to remove residual solution; and
   (d) drying said product to provide a faujasite product containing a reduced amount of organic template material.

9. An improved synthetic zeolite having free aperture diameter sizes ranging from about 3 to 100 Angstroms, said zeolite containing organic template material in free apertures less than about 4 Angstroms and being free of organic template material in free apertures greater than about 4 Angstroms and having an $SiO_2/Al_2O_3$ ratio of at least 7:1.

10. The improved synthetic zeolite in accordance with claim 9 wherein said zeolite is faujasite.

11. The improved synthetic zeolite in accordance with claim 10 wherein the free apertures sizes range from about 3 to 15 Angstroms.

* * * * *